(12) United States Patent
Fairbanks et al.

(10) Patent No.: US 11,090,794 B2
(45) Date of Patent: Aug. 17, 2021

(54) CABLE STAPLE TOOL ASSEMBLY WITH A SELF-ADJUSTING CABLE GUIDE

(71) Applicant: Black & Decker Inc., New Britain, CT (US)

(72) Inventors: Jonathan W. Fairbanks, Coventry, RI (US); Wai Jun Ho, Somerville, MA (US)

(73) Assignee: Black & Decker Inc., New Britain, CT (US)

( * ) Notice: Subject to any disclaimer, the term of this patent is extended or adjusted under 35 U.S.C. 154(b) by 243 days.

(21) Appl. No.: 15/876,584

(22) Filed: Jan. 22, 2018

(65) Prior Publication Data

US 2019/0224834 A1    Jul. 25, 2019

(51) Int. Cl.
| | |
|---|---|
| *B25C 7/00* | (2006.01) |
| *H02G 1/06* | (2006.01) |
| *B25C 5/10* | (2006.01) |
| *B25C 5/06* | (2006.01) |

(52) U.S. Cl.
CPC ............... *B25C 7/00* (2013.01); *B25C 5/06* (2013.01); *B25C 5/10* (2013.01); *H02G 1/06* (2013.01)

(58) Field of Classification Search
CPC .. B25C 1/188; B25C 7/00; B25C 5/06; B25C 5/10; H02G 1/06
See application file for complete search history.

(56) References Cited

U.S. PATENT DOCUMENTS

| | | | |
|---|---|---|---|
| 2,716,749 A | 9/1955 | Timmerbeil | |
| 3,198,412 A | 8/1965 | Roosa | |
| 3,612,379 A * | 10/1971 | Panock | B27F 7/34 227/8 |
| 3,762,620 A | 10/1973 | Geist | |
| 3,858,781 A | 1/1975 | Obergfell et al. | |
| 4,087,035 A * | 5/1978 | Harmon | B25C 5/06 227/120 |

(Continued)

FOREIGN PATENT DOCUMENTS

WO    WO 2015/030950 A1    3/2015

OTHER PUBLICATIONS

Extended European Search Report dated Aug. 5, 2019 in European Patent Application No. 19152412.3.

*Primary Examiner* — Anna K Kinsaul
*Assistant Examiner* — Daniel Jeremy Leeds
(74) *Attorney, Agent, or Firm* — Harness, Dickey & Pierce, P.L.C.

(57) ABSTRACT

A self-adjusting cable guide can be coupled to a nosepiece assembly having a contact end and can be movable between an extended guide position and a retracted guide position relative to the contact end of the nosepiece assembly. A contact trip arm can be adjacent the cable guide and can have a distal end positioned to contact a cable received within a guide recess of the cable guide. The contact trip arm can be movable between an extended arm position corresponding to an inactive state of the tool and a retracted arm position corresponding to an active state of the tool. In addition, the cable guide can have a non-aligned orientation, in which cooperating misalignment stop surfaces can engage each other to stop movement of the self-adjusting cable guide toward the retracted guide position and an aligned orientation in which movement into the retracted guide position is permitted.

9 Claims, 8 Drawing Sheets

(56) References Cited

U.S. PATENT DOCUMENTS

| | | | |
|---|---|---|---|
| 4,211,353 A | 7/1980 | Aunis | |
| 4,227,637 A | 10/1980 | Haytayan | |
| 4,380,312 A * | 4/1983 | Landrus | B25C 5/06 227/116 |
| 4,552,296 A * | 11/1985 | Sheng | B25C 5/06 227/109 |
| 4,621,758 A | 11/1986 | Anstett | |
| 4,805,824 A | 2/1989 | Erickson | |
| 5,197,646 A | 3/1993 | Nikolich | |
| 5,263,626 A * | 11/1993 | Howard | B25C 1/188 227/142 |
| 5,735,444 A | 4/1998 | Wingert | |
| 5,918,790 A * | 7/1999 | Donnell | B25C 7/00 227/119 |
| 5,931,364 A | 8/1999 | Dennis | |
| 6,082,604 A | 7/2000 | Dennis | |
| 7,055,729 B2 | 6/2006 | Taylor et al. | |
| 7,175,063 B2 * | 2/2007 | Osuga | B25C 1/008 227/130 |
| 7,770,771 B2 | 8/2010 | Tsai | |
| 7,918,374 B2 | 4/2011 | Gardner et al. | |
| 8,042,717 B2 * | 10/2011 | Lam | B25C 1/008 227/120 |
| 8,240,535 B2 | 8/2012 | Shor | |
| 8,292,143 B2 | 10/2012 | Lee et al. | |
| 8,336,748 B2 | 12/2012 | Hlinka et al. | |
| 8,413,865 B2 * | 4/2013 | Mandel | B25C 5/06 227/110 |
| 8,496,151 B2 | 7/2013 | Shor | |
| 8,777,078 B2 | 7/2014 | Kakuda et al. | |
| 10,150,208 B2 * | 12/2018 | Lin | B25C 1/184 |
| 2008/0179371 A1 * | 7/2008 | Gardner | B25C 5/15 227/1 |
| 2009/0114696 A1 * | 5/2009 | Chen | B25C 1/008 227/8 |
| 2018/0099400 A1 * | 4/2018 | Wong | B25C 1/188 |

* cited by examiner

CABLE STAPLE TOOL ASSEMBLY WITH A SELF-ADJUSTING CABLE GUIDE

FIELD

The present disclosure relates to a cable staple tool assembly including a cable guide.

BACKGROUND

This section provides background information related to the present disclosure which is not necessarily prior art.

Cable staple tools are used in stapling tubes or electrical cables to a workpiece, such as a wooden two-by-four. The nosepiece of cable staple tools can include a cable guide that is intended to assure the electrical cable is properly centered relative to the cable staple tool. This helps insure that the legs of the staple pass outside the cable so that neither leg of the staple is driven into the cable.

Wire guides typically consist of a central recess between two guide legs. The height of the recess, or the length of each guide leg, of wire guides is fixed. In contrast, the corresponding heights of electrical cables that the tool is intended to staple are variable.

For example, it is sometimes desirable to staple a single, relatively thin, low-height, cable. If the cable guide leg length or recess height is too long for such a thin cable, then the cable guide legs will engage the workpiece before the nosepiece of the tool engages the surface of the cable. This will cause a gap between the cable and the nosepiece of the tool. This, in turn, means the staple driver will not extend far enough to drive the staple into contact with the thin cable, resulting in a cable that is not firmly secured.

In addition, it is sometimes desirable to staple two stacked cables simultaneously, resulting in a double-height cable. If the cable guide leg length, or recess height, is too short for such a stacked cable stapling situation, then the wire guide will only operate to insure the upper cable is properly centered. The cable guide legs will not be long enough to insure the lower cable is properly centered. As a result, the cable guide will not insure that one of the legs of the staple will not pierce the lower cable.

In order to optimize the cable guide for different cable heights, a user is typically required to remove and replace one cable guide with another cable guide. It has alternatively been proposed to provide cable guides that are manually adjustable by a user between different fixed positions relative to the nosepiece of the tool. When a user does not replace the cable guide with the correct one, or does not properly adjust such manually adjustable cable guides into the proper fixed position, these proposed solutions can suffer from the same problems as those discussed above.

Cable staple tools can also be provided with a contact trip arm. Such a contact trip arm can operate together with the cable guide to prevent operation of the staple driving tool until the contact arm is moved from an extended, inactive position to a retracted, active position through contact with a cable positioned within the cable guide. The disclosed combination of self-adjusting cable guide and contact trip arm can help prevent the tool from firing until the tool is properly positioned relative to the cable as discussed hereinafter.

SUMMARY

This section provides a general summary of the disclosure, and is not a comprehensive disclosure of its full scope or all of its features.

In accordance with one aspect of the present disclosure, a cable staple tool assembly can include a cable staple driver. A nosepiece assembly can define a driver channel through which the cable staple driver is driven. The nosepiece assembly can have a contact end. A self-adjusting cable guide can be coupled to the nosepiece assembly and movable between an extended guide position and a retracted guide position relative to the contact end of the nosepiece assembly. The self-adjusting cable guide can include a guide recess between two arms extending outwardly away from the contact end of the nosepiece assembly. A contact trip arm can be adjacent the self-adjusting cable guide and can have a distal end positioned to contact a cable received within a guide recess of the self-adjusting cable guide. The contact trip arm can be movable between an extended arm position corresponding to an inactive state of the tool and a retracted arm position corresponding to an active state of the tool.

In accordance with another aspect of the present disclosure, a cable staple tool assembly can include a cable staple driver. A nosepiece assembly can define a driver channel through which the cable staple driver is driven. The nosepiece assembly can have a contact end. A self-adjusting cable guide can be coupled to the nosepiece assembly and movable between an extended guide position and a retracted guide position relative to the contact end of the nosepiece assembly. The self-adjusting cable guide can include a guide recess between two arms extending outwardly away from the contact end of the nosepiece assembly. A contact trip arm can be adjacent the self-adjusting cable guide and can have a distal end positioned to contact a cable received within a guide recess of the self-adjusting cable guide. The contact trip arm can be movable between an extended arm position corresponding to an inactive state of the tool and a retracted arm position corresponding to an active state of the tool. The self-adjusting cable guide can be movable between an aligned orientation and a non-aligned orientation relative to the nosepiece assembly. When the self-adjusting cable guide is in the non-aligned orientation, cooperating misalignment stop surfaces can engage each other to stop movement of the self-adjusting cable guide toward the retracted guide position. When the self-adjusting cable guide is in the aligned orientation, the self-adjusting cable guide can be permitted to move toward the retracted guide position without engagement of the cooperating misalignment stop surface to stop movement of the self-adjusting cable guide.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-11 illustrate one example embodiment of a cable staple tool assembly 20 of a cable staple tool 18. Such an assembly 20 and cable staple tool 18 are specifically designed to drive a staple 16 into a workpiece 14 straddling a tube or electrical cable 12 to secure the cable 12 to the workpiece 14. The cable staple assembly 20 can include a cable staple driver 22, and a nosepiece assembly 24 that at least partially defines a driver channel 26 through which the cable staple driver 22 is driven. The nosepiece assembly 24 can include a nose 28 and a nose cover 30. The nosepiece assembly 24 can also include a distal or contact end 32. In this example embodiment, the distal or contact end 32 of the nosepiece assembly 24 is provided by the nose 28 and the nose cover 30 defines at least a portion of the driver channel 26 of the nosepiece assembly 24.

Figure 10:
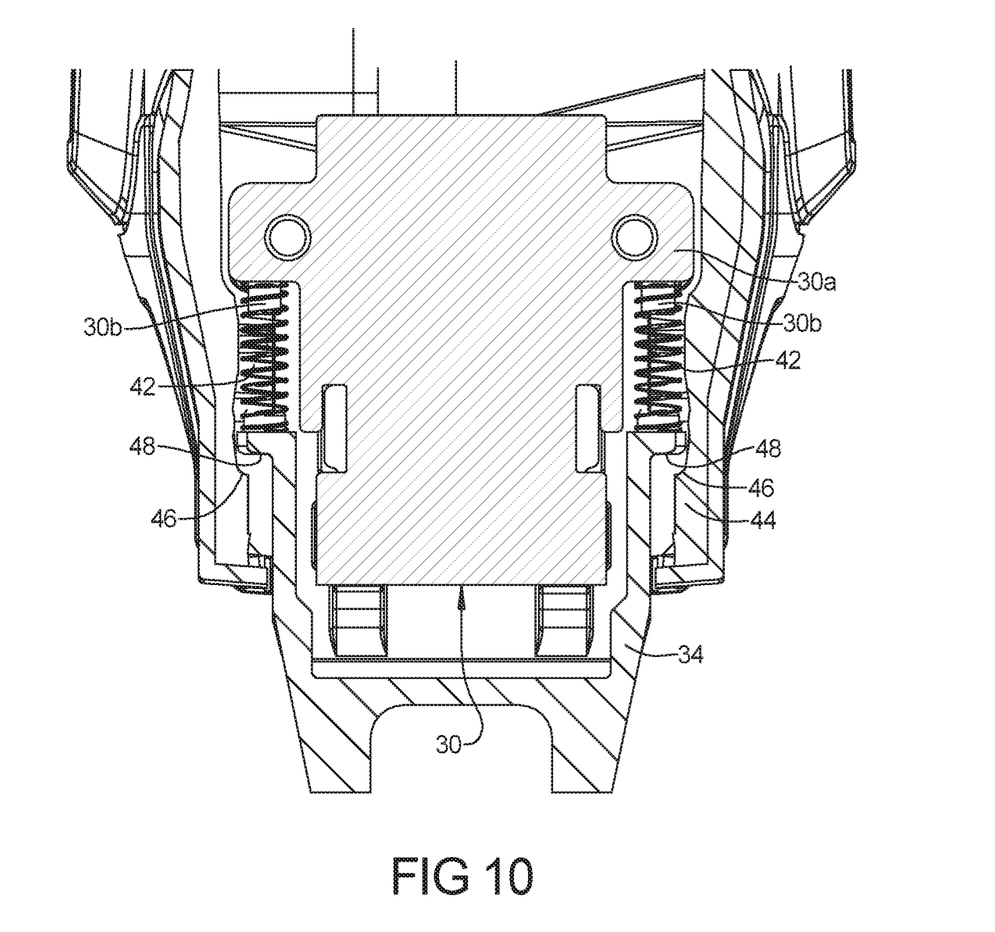
FIG. 10 is a partial cross-section view of the example cable staple tool assembly with a self-adjusting cable guide.
Figure 11:
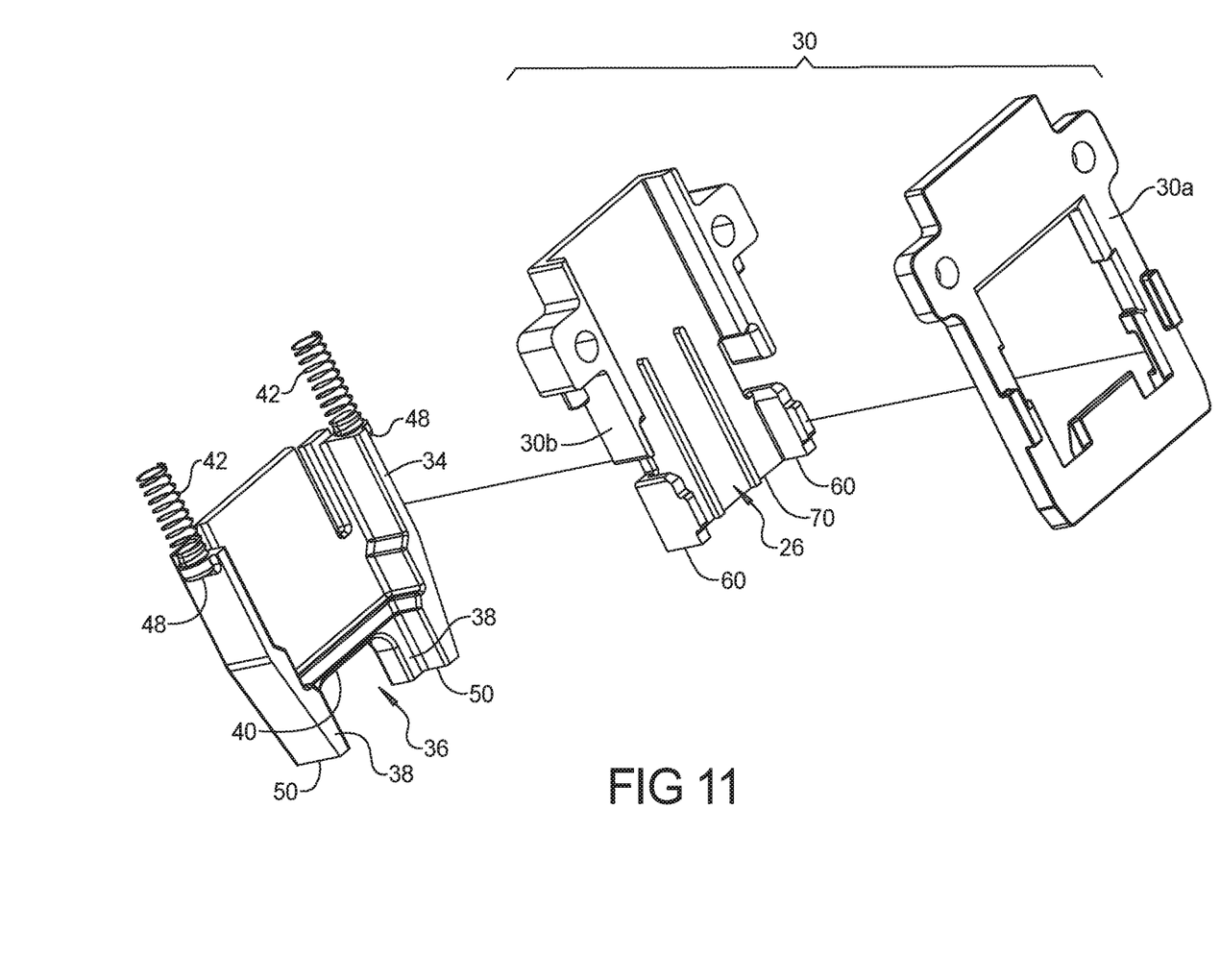
FIG. 11 is an exploded perspective view including the self-adjusting cable guide and nose cover of the example cable staple tool assembly.

A self-adjusting cable guide 34 is coupled to the nosepiece assembly 24 to be movable between an extended guide position (e.g., FIGS. 1 and 3) and a retracted guide position (e.g., FIGS. 2 and 4) relative to the distal end 32 of the nosepiece assembly 24. A biasing member 42, such as the illustrated pair of laterally spaced springs, can bias the self-adjusting cable guide 34 toward the extended guide position. The biasing member 42 can be positioned between the nose cover 30 of the nosepiece assembly 24 and the self-adjusting cable guide 34. Referring to FIGS. 10 and 11, a tool housing 44 can include an outward retention surface 46, which can be provided as a detent of the tool housing 44, that engages a corresponding outward retention surface 48, which can be provided as a protrusion, of the self-adjusting cable guide 34 to retain the self-adjusting cable guide 34 to the tool 18 and preventing it from moving past the extended guide position. In addition, the nose cover 30 can include a main body 30b and a cover 30a that define a portion of the driver channel 26 therebetween.

The self-adjusting cable guide 34 can include a guide recess 36 between two guide legs 38 that extend downwardly or outwardly from the distal end 32 of the nose 28 of the nosepiece assembly 24. The lateral distance between the pair of guide legs 38 or width "W" of the guide recess 36 is designed to accommodate corresponding lateral widths of the tubes or cables 12 that the tool 18 is intended to secure, and is positioned to protect the cables 12 from staple legs 17. The guide legs 38 can include distal ends 50 that can, in some cases, engage the workpiece 14.

As in the illustrated example, the guide recess 36 can include an upper surface or wall 40 extending between the guide legs 38. Such an upper wall 40 can contact a corresponding, opposing upper surface of a cable 12; at least in some situations. The height "H" of the legs 38 of a guide recess 36 having an upper wall 40 can be designed to be sufficient to adequately center both of a pair of stacked cables 12 in a dual stacked configuration (FIG. 7) so that a staple leg 17 of a driven staple 16 will not pierce either of the dual stacked cables 12.

Figure 1:
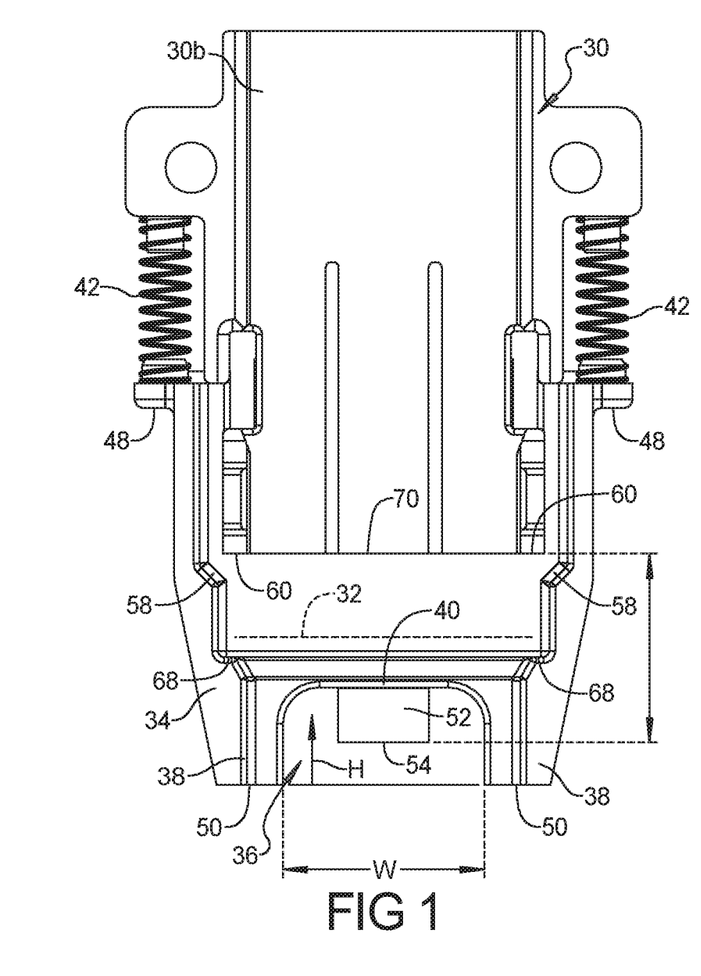
FIG. 1 is an elevation view of certain components of the example cable staple tool assembly with a self-adjusting cable guide of FIGS. 3-5 in accordance with the present disclosure, with the self-adjusting cable guide and the contact trip arm in their extended positions.
Figure 2:
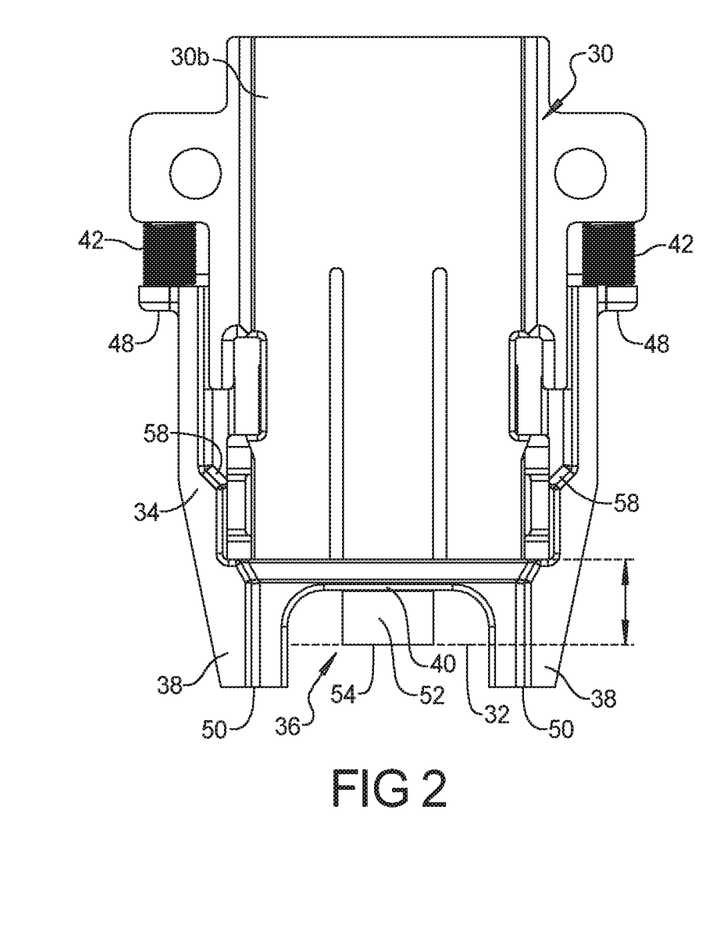
FIG. 2 is an elevation view of the components of FIG. 1, with the self-adjusting cable guide in a single cable retracted guide position and the contact trip arm in its retracted arm position.
Figure 3:
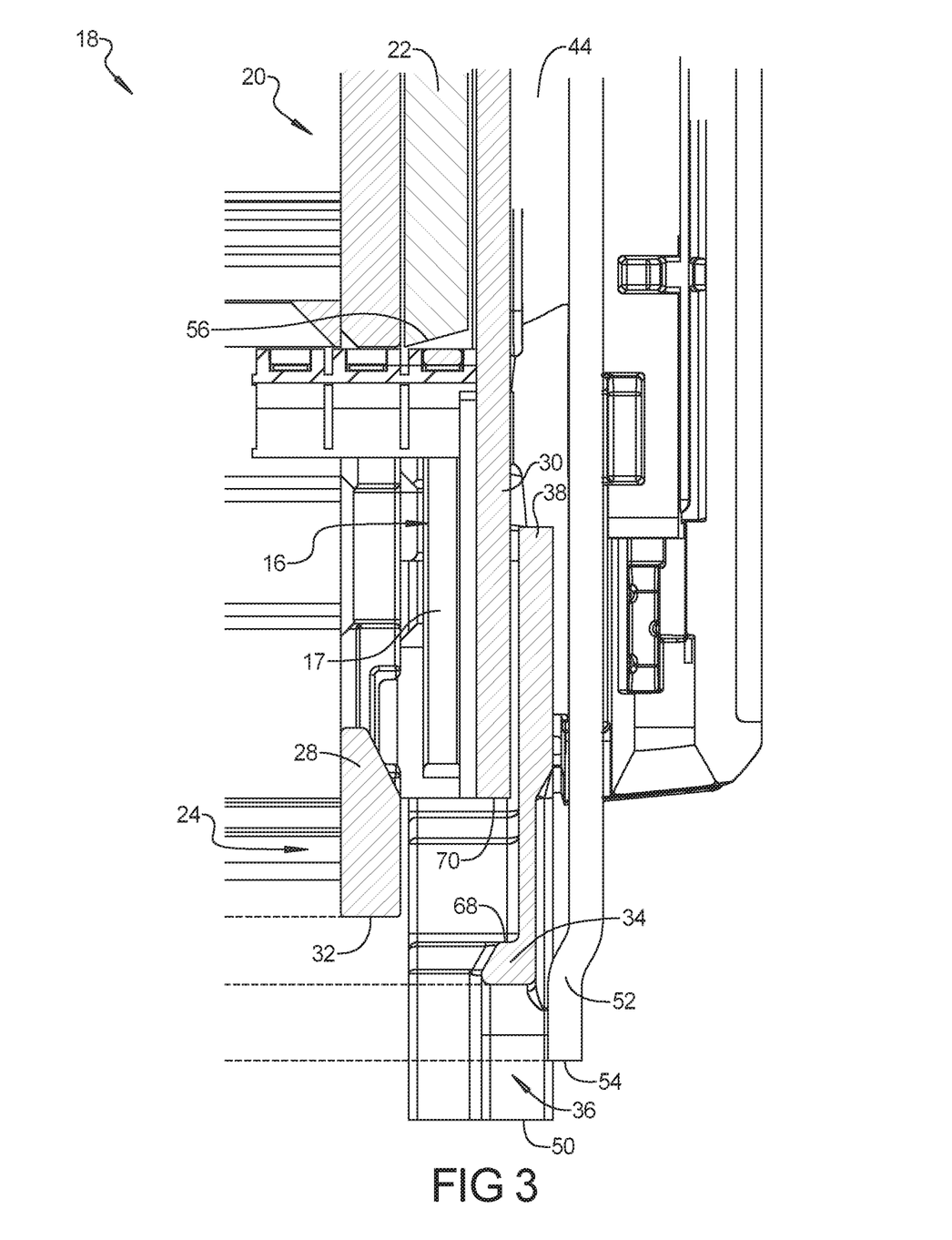
FIG. 3 is a partial cross-section view of the example cable staple tool assembly, with the self-adjusting cable guide and the contact trip arm in their extended positions.
Figure 4:
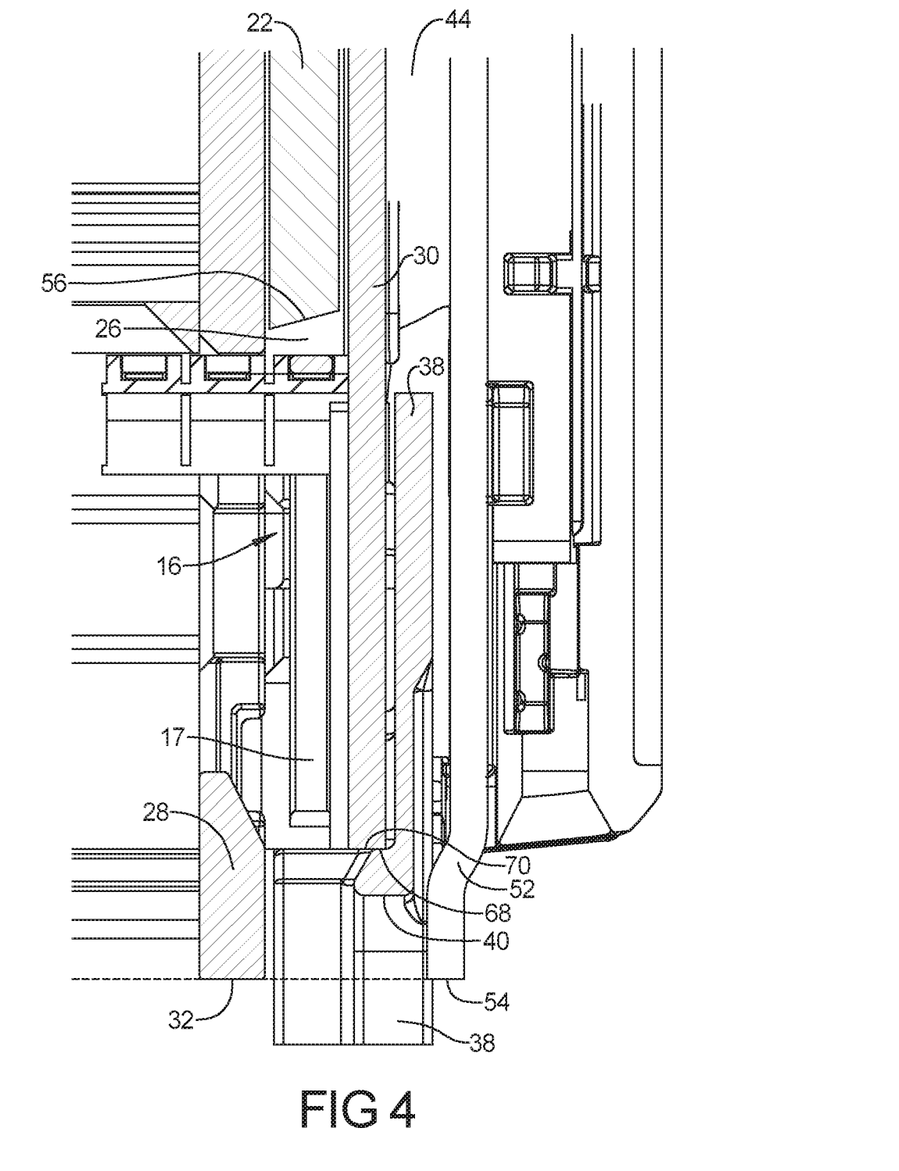
FIG. 4 is a partial cross-section view of the example cable staple tool assembly, with the self-adjusting cable guide in a single cable retracted guide position and the contact trip arm in its retracted arm position.
Figure 5:
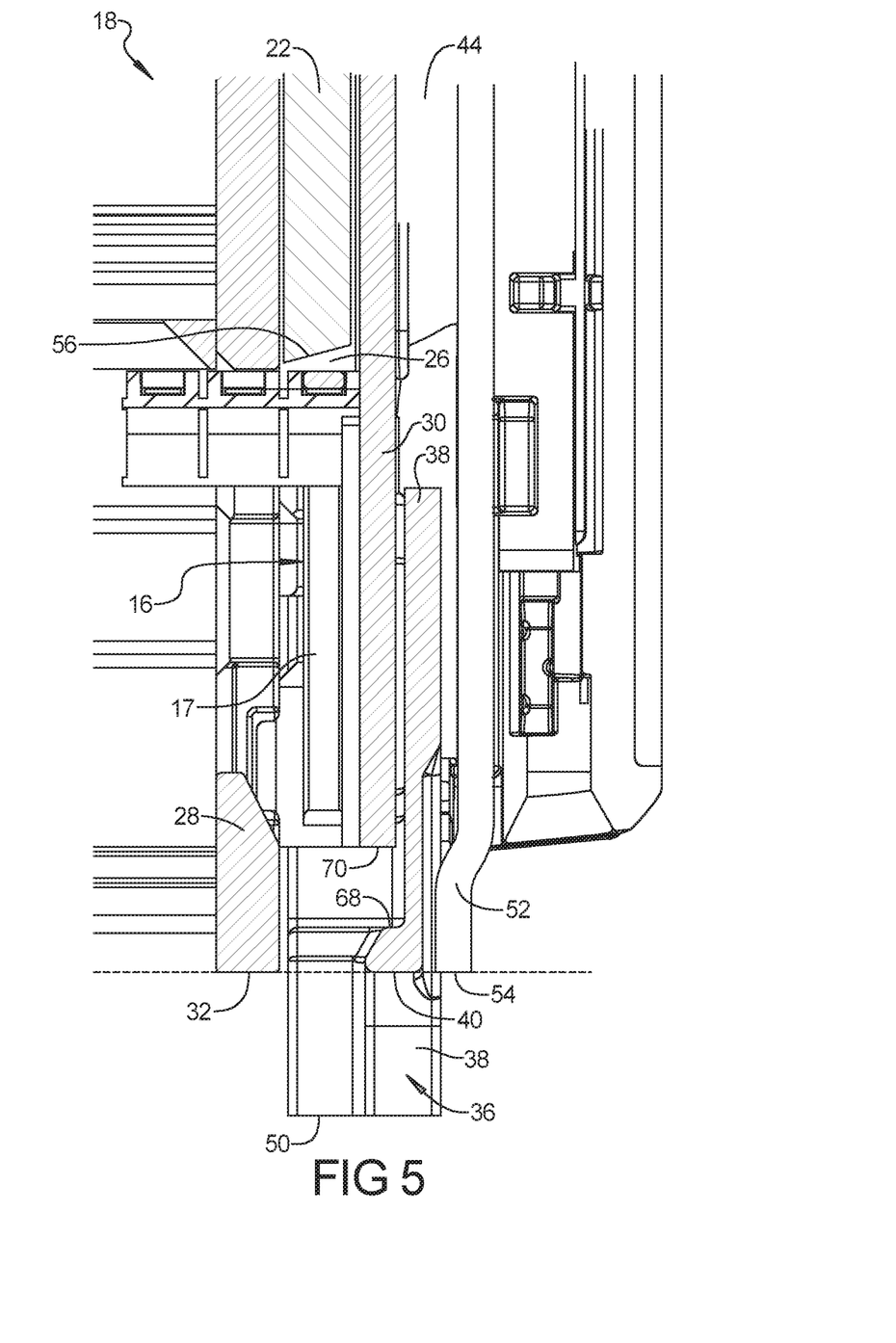
FIG. 5 is a partial cross-section view of the example cable staple tool assembly, with the self-adjusting cable guide in a double cable retracted guide position and the contact trip arm in its retracted arm position.
Figure 6:
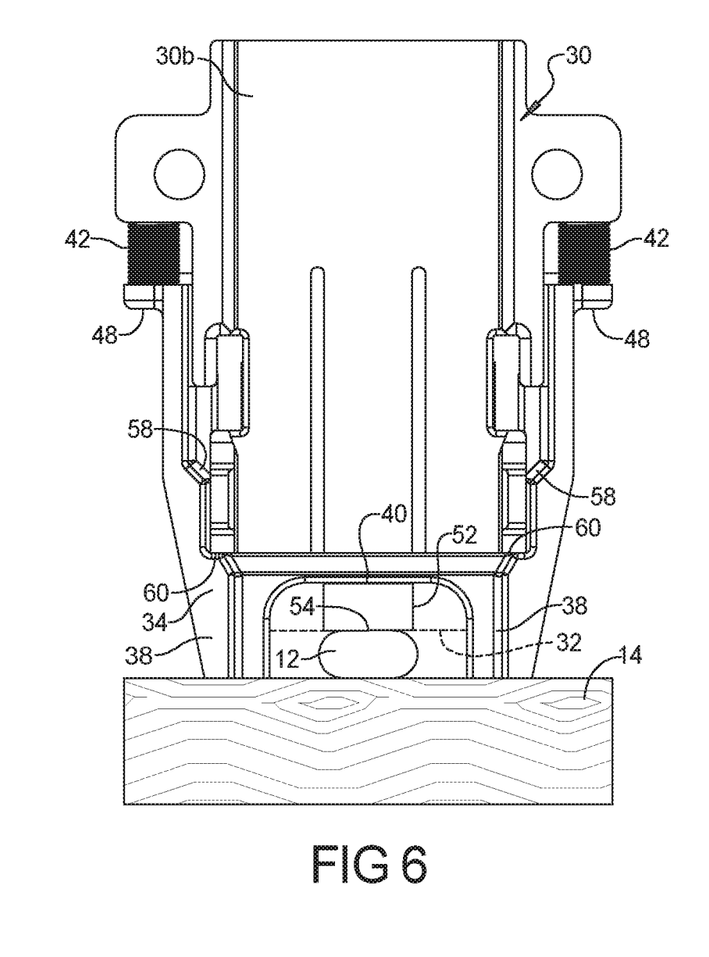
FIG. 6 is an elevation view of the components of FIG. 1 of the example cable staple tool assembly, with the self-adjusting cable guide in a single cable retracted guide position and the contact trip arm in its retracted arm position, and showing a cable and workpiece.

A contact trip arm 52 can be positioned adjacent the self-adjusting cable guide 34 and can have a distal end 54 positioned to contact a cable 12 received within the guide recess 36 of the self-adjusting cable guide 34. The contact trip arm 52 can be movable between an extended arm position (e.g., FIGS. 1 and 3) corresponding to an inactive state of the tool 18 and a retracted arm position (e.g., FIGS. 2, and 4-7) corresponding to an active state of the tool 18. As shown in FIGS. 4 and 5, the distal end 54 of the contact trip arm 52 in its retracted arm position can be at a vertical height or position that is substantially the same as the vertical height or position of the distal end 32 of the nose 28. This is because both the distal end 32 of the nose 28 and the distal end 54 of the contact trip arm 52 rests upon the cable or cables 12 when the tool 18 is ready to fire a staple 16 into workpiece 14 around the cable or cables 12.

This same vertical height or position can also generally correspond to a position or location of the distal end 56 of the driver 22 when the driver 22 is in its terminal or extended driver position. This can insure that the driver 22 fully drives the staple 16 into the workpiece 14 and snugly up against the cable or cables 12, but without the staple 16 unduly biting into the cable or cables 12.

The self-adjusting cable guide 34 automatically or self-adjusts for use with cables 12 of various vertical heights or thicknesses. The self-adjusting cable guide 34 can self-adjust or move to a first vertical position exemplified in FIGS. 2, 4 and 6 to accommodate a single cable 12 having a vertical height that is about one-half that of the height "H" of the recess 36. Even though the cable 12 does not contact the upper wall 40 of the guide recess 36 of the self-adjusting cable guide 34 in this exemplary first vertical position, both the distal end 32 of the nose 28 and the distal end 54 of the contact trip arm 52 contact the top of the cable 12. Thus, the distal end 32 of the nose 28 and the distal end 54 of the contact trip arm 52 are substantially vertically aligned with each other with the contact trip arm 52 in its retracted arm position, placing the tool 18 in its active state ready to drive the staple 16. In addition, the guide legs 38 extend along opposite sides of the cable 12 to insure proper centering of the cable 12 so that a leg 17 of a driven staple 16 will not pierce the cable 12.

Figure 7:
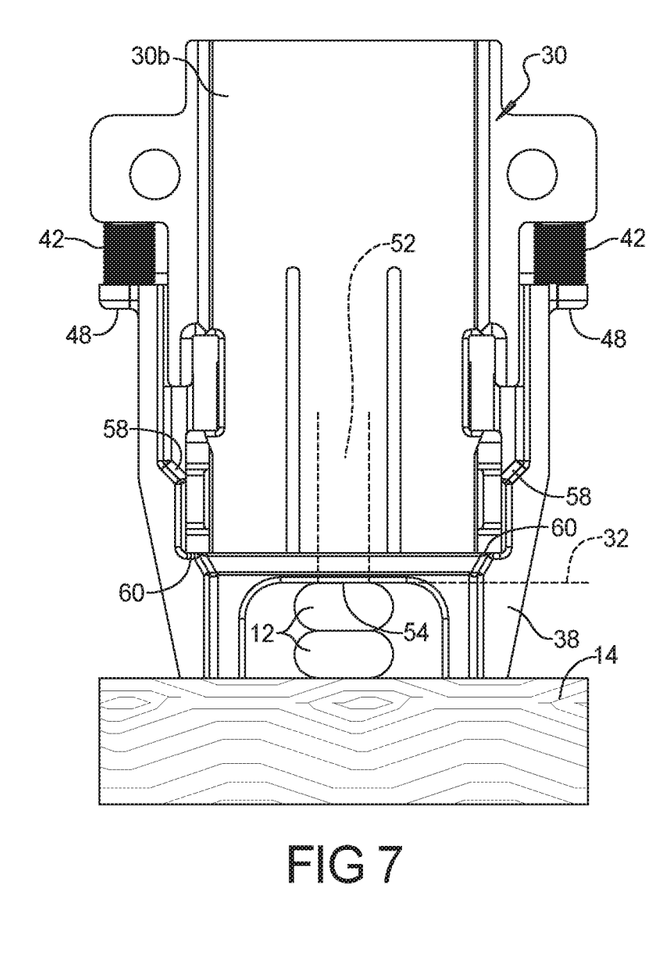
FIG. 7 is an elevation view of the components of FIG. 1 of the example cable staple tool assembly, with the self-adjusting cable guide in a double cable retracted guide position and the contact trip arm in its retracted arm position, and showing a cable and workpiece.

The self-adjusting cable guide 34 can automatically adjust or move to a second vertical position exemplified in FIGS. 5 and 7 to accommodate, e.g., two cables 12 that each have a vertical height that can be about one-half that of the height "H" of the recess 36. In this exemplary second vertical position, the upper cable 12 can contact the upper wall 40 of the guide recess 36 of the self-adjusting cable guide 34. When the self-adjusting cable guide 34 is in the second vertical position, the distal end 32 of the nose 28, the distal end 54 of the contact trip arm 52, and the upper wall 40 of the guide recess 36 can all contact the top of the upper cable 12.

In the second vertical position (like the first vertical position), the distal end 32 of the nose 28 and the distal end 54 of the contact trip arm 52 are substantially vertically aligned with each other with the contact trip arm 52 in its retracted arm position, placing the tool 18 in its active state ready to drive the staple 16. In addition, the upper wall 40 of the guide recess 36 of the self-adjusting cable guide 34 can also contact the top of the upper cable 12 with the guide legs 38 extending along opposite sides of the cables 12 to insure proper centering of the cable 12, so that a staple leg 17 of a driven staple 16 will not pierce the cable 12. In cases where a height "H" of the guide recess 36 is greater than the overall height of the stacked cables 12, the upper wall 40 of the guide recess 36 of the self-adjusting cable guide 34 will not contact the top of the upper cable 12. In cases where a height "H" of the guide recess 36 is less than the overall height of the stacked cables 12, there can be a gap (not shown) between the distal end 50 of the guide legs 38 and the workpiece 14. Nevertheless, the guide legs 38 can extend sufficiently along the opposite sides of the lowermost cable 12 to insure both cables 12 are properly centered.

For example, the guide recess 36 or guide leg 38 height "H" can be more than one times the height of the cables 12 that the tool is intended to staple in a dual stacked configuration. In some instances, the guide recess 36 or guide leg 38 height "H" can be between about 1.3 and about 1.7 times a corresponding height of the cables 12 that the tool 18 and assembly 20 is intended to secure in a dual stacked configuration. In some instances, the guide recess 36 or guide leg 38 height "H" can be between about 1.5 times a corresponding height of the cables 12 that the tool 18 and assembly 20 is intended to secure in a dual stacked configuration. In some instances, the guide recess 36 or guide leg 38 height "H" can be between about 5 mm and about 10 mm. In some instances, the guide recess 36 or guide leg 38 height "H" can be between about 6 mm and about 8 mm.

Figure 8:
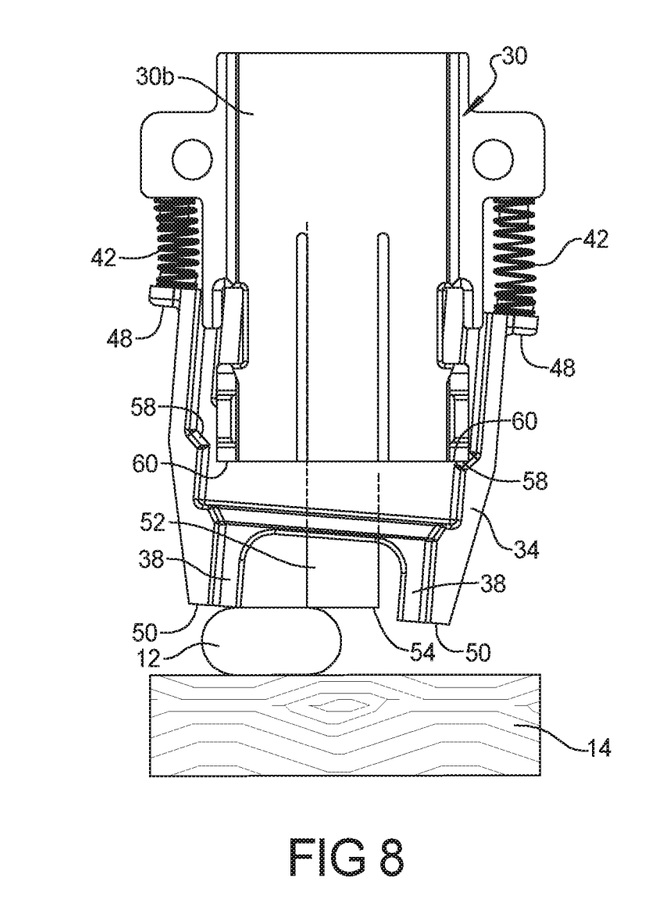
FIG. 8 is an elevation view of the components of FIG. 1 of the example cable staple tool assembly, with the self-adjusting cable guide in a non-aligned orientation as a result of an end of one guide leg contacting the cable.
Figure 9:
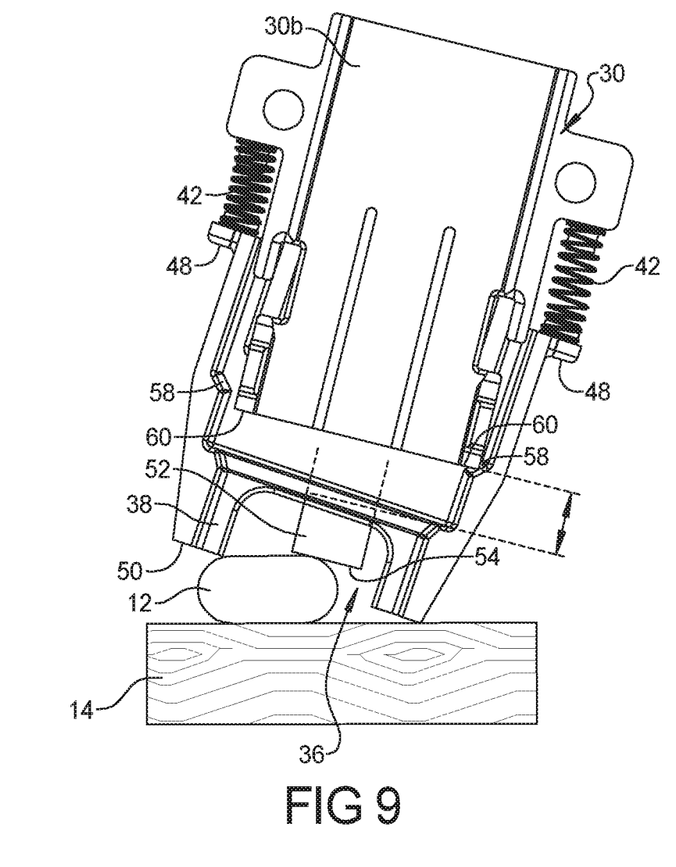
FIG. 9 is another elevation view similar to FIG. 8.

Referring to FIGS. 8 and 9, the self-adjusting cable guide 34 can also help insure that the contact trip arm 52 cannot be moved to its retracted arm position, placing the tool 18 in its active state, when the cable or cables 12 are not properly centered between the guide legs 38. For example, when the cable or cables 12 contact the distal end 50 of one of the guide legs 38, instead of passing between the guide legs 38, a staple leg 17 of a staple 16 driven from the tool 18 would pierce the cable 12. In order to avoid this, the self-adjusting cable guide 34 can be mounted for limited lateral rocking movement relative to the nose cover 30 of the nosepiece assembly 24 between an aligned orientation and a non-aligned orientation relative to the nose cover 30 of the nosepiece assembly 24.

For example, the self-adjusting cable guide 34 can include fault or misalignment detents or stop surfaces 58 that engage cooperating fault or misalignment detents or stop surfaces 60 of the nose cover 30 of the nosepiece assembly 24 when the self-adjusting cable guide 34 is in the non-aligned orientation to stop movement of the self-adjusting cable guide 34 toward the retracted guide position. The misalignment stop surfaces 58, 60 can be positioned to engage each other to stop the upper wall 40 at a vertical height that is below the vertical height of the distal end 54 of the contact trip arm 52 when the contact trip arm 52 is in its retracted arm position corresponding to the active state of the tool 18. Thus, the self-adjusting cable guide 34 can minimize or prevent a staple 16 from being driven when the recess 36 is misaligned with the cable 12 as a result of one the guide legs 38 being positioned on the cable 12 causing the self-adjusting cable guide 34 to move into the non-aligned orientation (FIGS. 7 and 8).

In the aligned orientation (e.g., FIGS. 6 and 7) when the recess 36 is properly aligned with the cable 12 and the guide legs 38 are properly positioned around the cable or cables 12, the cooperating misalignment stop surfaces 58, 60 are positioned to move past each other without engaging and stopping the upward movement of the self-adjusting cable guide 34. Thus, the self-adjusting cable guide 34 is able to move to a vertical height that allows the distal end 54 of the contact trip arm 52 to move into its retracted position corresponding to the active state of the tool, and allowing a staple 16 to be driven by the tool 18.

The self-adjusting cable guide 34 can include an inward stop surface 68 that is engageable with a corresponding inward stop surface 70 of the nosepiece assembly 20 to prevent the self-adjusting cable guide 36 from moving inward beyond the retracted guide position. As in the illustrated example, the inward stop surface 70 can be provided on the nose cover 30 and can partially or completely comprise a shared common surface 70 with the misalignment stop surface 60. The other cooperating inward stop surface 68 can be provided on the self-adjusting cable guide 34. As with the other stop surfaces, the cooperating inward stop surfaces 68, 70 can be provided as protrusions or detents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cable staple tool assembly comprising:
   a cable staple driver;
   a nosepiece assembly defining a driver channel through which the cable staple driver is driven, the nosepiece assembly having contact end;
   a self-adjusting cable guide coupled to the nosepiece assembly and movable between an extended guide position and a retracted guide position relative to the contact end of the nosepiece assembly, the self-adjusting cable guide including two arms extending outwardly away from the contact end of the nosepiece assembly, and the two arms being rigidly connected to each other by a bridging upper surface with the two arms and the bridging upper surface forming a guide recess having an inverted U-shape;
   a contact trip arm adjacent the self-adjusting cable guide and having a distal end positioned to contact a cable received within the guide recess of the self-adjusting cable guide, the contact trip arm being movable between an extended arm position corresponding to an inactive state of the tool and a retracted arm position corresponding to an active state of the tool;

wherein the self-adjusting cable guide is movable between an aligned orientation and a non-aligned orientation relative to the nosepiece assembly, and in the non-aligned orientation, a distal end of each of the two arms being positioned at different vertical heights relative to the contact end of the nosepiece assembly to cause cooperating misalignment stop surfaces to engage each other to stop movement of the self-adjusting cable guide toward the retracted guide position, and in the aligned orientation, the distal end of each of the two arms being positioned at a common vertical height relative to the contact end of the nosepiece assembly to permit the self-adjusting cable guide to move toward the retracted guide position without engagement of the cooperating misalignment stop surfaces to stop movement of the self-adjusting cable guide.

2. The cable staple tool assembly of claim 1, wherein the self-adjusting cable guide is mounted for limited lateral rocking movement relative to the nosepiece assembly between the aligned orientation and the non-aligned orientation relative to the nosepiece assembly.

3. The cable staple tool assembly of claim 2, wherein the nosepiece assembly includes a housing, and wherein the cooperating misalignment surfaces comprise a first pair of laterally spaced surfaces of the self-adjusting cable guide, and the cooperating misalignment surfaces comprise a second pair of laterally spaced surfaces of the nosepiece assembly.

4. The cable staple tool assembly of claim 1, wherein the nosepiece assembly includes a nose cover, and wherein the cooperating misalignment surfaces comprise a first pair of laterally spaced surfaces of the self-adjusting cable guide, and the cooperating misalignment surfaces comprise a second pair of laterally spaced surfaces of the nose cover.

5. The cable staple tool assembly of claim 4, wherein the self-adjusting cable guide is mounted for limited lateral rocking movement relative to the nosepiece assembly between the aligned orientation and the non-aligned orientation relative to the nosepiece assembly.

6. The cable staple tool assembly of claim 1, wherein the cooperating misalignment stop surfaces are positioned to engage each other to stop movement of the self-adjusting cable guide at a position in which an uppermost central portion of the guide recess is at a vertical height that is below the vertical height of the distal end of the contact trip arm in the retracted arm position corresponding to the active state of the tool.

7. The cable staple tool assembly of claim 6, wherein the self-adjusting cable guide is mounted for limited lateral rocking movement relative to the nosepiece assembly between the aligned orientation and the non-aligned orientation relative to the nosepiece assembly.

8. The cable staple tool assembly of claim 7, wherein the nosepiece assembly includes a housing, and wherein the cooperating misalignment surfaces comprise a first pair of laterally spaced surfaces of the self-adjusting cable guide, and the cooperating misalignment surfaces comprise a second pair of laterally spaced surfaces of the nosepiece assembly.

9. The cable staple tool assembly of claim 7, wherein the nosepiece assembly includes a nose cover, and wherein the cooperating misalignment surfaces comprise a first pair of laterally spaced surfaces of the self-adjusting cable guide, and the cooperating misalignment surfaces comprise a second pair of laterally spaced surfaces of the nose cover.

* * * * *